United States Patent
Holung et al.

(12)

(10) Patent No.: US 6,172,871 B1
(45) Date of Patent: Jan. 9, 2001

(54) METHOD AND SYSTEM IN A DATA PROCESSING SYSTEM FOR EFFICIENTLY COOLING A PORTABLE COMPUTER SYSTEM

(75) Inventors: Joseph Anthony Holung, Wake Forest; Vinod Kamath, Raleigh; Mohanlal Savji Mansuria, Apex; Tin-Lup Wong, Chapel Hill, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/282,299

(22) Filed: Mar. 31, 1999

(51) Int. Cl.$^7$ .............................. H05K 7/20; F28D 15/02
(52) U.S. Cl. ........................ 361/687; 361/695; 361/696; 361/697; 361/701; 62/259.2; 165/104.33
(58) Field of Search .......................... 361/687, 694–703, 361/701, 717–719; 437/209, 221, 222; 438/106, 118, 584, 675; 364/708.1; 29/832, 841, 854, 729, 739; 62/259.2; 165/80.3, 104, 33, 80.4, 185, 104.21–104.26, 104.29

(56) References Cited

U.S. PATENT DOCUMENTS 5,095,404 * 3/1992 Chao ...................................... 361/385
5,133,403   7/1992 Yokono et al. ....................... 165/185
5,187,645   2/1993 Spalding et al. ..................... 361/393

(List continued on next page.)

Primary Examiner—Leo P. Picard
Assistant Examiner—Anatoly Vortman
(74) Attorney, Agent, or Firm—Bernard D. Bogdon; Andrew Dillon

(57) ABSTRACT

A portable data processing system and method are disclosed for improving cooling of a microprocessor included within the system. The portable data processing system includes a base housing for housing a CPU and a display housing for housing a display. A heat sink is established within the base housing. The heat sink is formed from a highly conductive composite material. A heat dissipater is established within the display housing. The heat dissipater is comprised of a highly conductive composite material. The heat dissipater and heat sink are capable of receiving a heat pipe. Heat is transferred from the heat sink to the heat dissipator utilizing the heat pipe. In a second embodiment, the portable system is docked with a docking station, and a heat probe is included which is utilized to dissipate additional heat from the microprocessor to a large fan sink included within the docking station.

26 Claims, 2 Drawing Sheets

U.S. PATENT DOCUMENTS

| | | | |
|---|---|---|---|
| 5,258,888 | 11/1993 | Kornsky | 361/704 |
| 5,339,214 * | 8/1994 | Nelson | 361/695 |
| 5,377,745 * | 1/1995 | Hsieh | 165/80.3 |
| 5,402,311 | 3/1995 | Nakajima | 361/687 |
| 5,424,913 | 6/1995 | Swindler | 361/687 |
| 5,430,609 | 7/1995 | Kikinis | 361/687 |
| 5,513,070 | 4/1996 | Xie et al. | 361/700 |
| 5,557,500 | 9/1996 | Baucom et al. | 361/687 |
| 5,566,752 * | 10/1996 | Arnold et al. | 165/185 |
| 5,568,360 | 10/1996 | Penniman et al. | 361/687 |
| 5,590,025 * | 12/1996 | Clemens | 361/695 |
| 5,598,320 | 1/1997 | Toedtman et al. | 361/687 |
| 5,606,341 * | 2/1997 | Aguilera | 345/87 |
| 5,634,351 | 6/1997 | Larson et al. | 62/259.2 |
| 5,640,302 | 6/1997 | Kikinis | 361/687 |
| 5,646,822 * | 7/1997 | Bhatia et al. | 361/687 |
| 5,666,261 | 9/1997 | Aguilera | 361/681 |
| 5,694,292 | 12/1997 | Paulsel et al. | 361/686 |
| 5,704,212 * | 1/1998 | Erler et al. | 62/3.2 |
| 5,725,050 * | 3/1998 | Meyer, IV et al. | 165/104.33 |
| 5,726,858 | 3/1998 | Smith et al. | 361/705 |
| 5,731,952 | 3/1998 | Ohgami et al. | 361/687 |
| 5,764,482 * | 6/1998 | Meyer, IV et al. | 361/699 |
| 5,764,483 * | 6/1998 | Ohashi et al. | 361/699 |
| 5,766,691 * | 6/1998 | Arnold et al. | 427/450 |
| 5,768,102 * | 6/1998 | Ma | 361/695 |
| 5,781,409 | 7/1998 | Mecredy, III | 361/687 |
| 5,790,376 | 8/1998 | Moore | 361/700 |
| 5,796,581 | 8/1998 | Mok | 361/687 |
| 5,822,187 * | 10/1998 | Garner et al. | 361/687 |
| 5,847,925 * | 12/1998 | Progl et al. | 361/687 |
| 5,884,049 * | 3/1999 | Atkinson | 395/281 |
| 5,898,569 * | 4/1999 | Bhatia | 361/700 |
| 5,959,836 * | 9/1999 | Bhatia | 361/687 |
| 5,966,286 * | 10/1999 | O'Connor et al. | 361/699 |
| 5,974,556 * | 10/1999 | Jackson et al. | 713/322 |

* cited by examiner

METHOD AND SYSTEM IN A DATA PROCESSING SYSTEM FOR EFFICIENTLY COOLING A PORTABLE COMPUTER SYSTEM

CROSS-REFERENCE TO RELATED APPLICATIONS

The present invention is related to the subject matter of co-pending patent application Ser. No. 09/149,838, filed on Sep. 8, 1998, entitled "COMPUTER INCORPORATING HEAT DISSIPATOR WITH HINGED HEAT PIPE ARRANGEMENT FOR ENHANCED COOLING CAPACITY" and incorporated herein by reference.

BACKGROUND OF THE INVENTION

1. Field of the Invention

The present invention relates in general to data processing systems and, in particular, to a portable data processing system including a cooling apparatus for efficiently cooling a microprocessor included within the portable system. Still more particularly, the present invention relates to a method and system in a data processing system including a portable computer system coupled to a docking station for efficiently cooling a microprocessor included within the portable computer system.

2. Description of the Related Art

Personal computer systems have attained widespread use for providing computing power to many segments of today's modern society. Personal computer systems can usually be defined as a desk top, floor standing, or portable microcomputer that consists of a system unit having at least one system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar, or planar) to electronically connect these components together. These systems are designed primarily to give independent computing power to a single user and are inexpensively priced for purchase by individuals or small businesses. Examples of such personal computer systems are IBM's Intellistation and IBM's PC 300 PL and PC 300 GL.

The capacity and performance of portable personal computers, such as laptop computers, notebook computers, and the like, have recently been enhanced to such an extent that thermal dissipation requirements of these computers have soared. The increase in the thermal dissipation requirements is a result of ever increasing CPU performance and the additional functionality, such as DVD, modem, audio, and others. The ability to efficiently dissipate the heat generated by these faster components represents an opportunity for a potential competitive advantage as well as a significant product differentiation from currently available and commercially sold portable personal computer systems.

Often, portable personal computer systems are coupled to docking stations to enhance the operation of the portable computer system. The docking station may include additional resources, such as a hard disk drive, which may be utilized by the portable computer.

Therefore a need exists for a method and system in a portable data processing system for efficiently cooling a microprocessor included within the portable computer system.

SUMMARY OF THE INVENTION

A portable data processing system and method are disclosed for improving cooling of a microprocessor included within the system. The portable data processing system includes a base housing for housing a CPU and a display housing for housing a display. A heat sink is established within the base housing. The heat sink is formed from a highly conductive composite material. A heat dissipater is established within the display housing. The heat dissipater is comprised of a highly conductive composite material. The heat dissipater and heat sink are capable of receiving a heat pipe. Heat is transferred from the heat sink to the heat dissipator utilizing the heat pipe. In a second embodiment, the portable system is docked with a docking station, and a heat probe is included which is utilized to dissipate additional heat from the microprocessor to a large fan sink included within the docking station.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts and not as limiting upon the present invention.

The present invention is a method and system for efficiently cooling a microprocessor included within a portable computer system. The portable computer includes a base housing for housing the CPU and a display housing for housing a display. A heat sink is included within the base housing for dissipating heat generated by the CPU. A heat pipe is received by the heat sink and a heat dissipator included within the display housing. The heat pipe transfers heat from the heat sink to the heat dissipator.

The heat sink also includes a fan at one end of the heat sink, and an opening at a second, opposing end of the heat sink. A spreader plate is coupled to a flat, smooth top of the heat sink for further dissipating heat from the CPU. The heat pipe is coupled to the spreader plate.

The heat sink and heat dissipator plate are both formed from a highly conductive composite material. The material is a carbon fiber composite material.

The portable computer system may be docked with a docking station. The docking station includes a heat probe formed from the highly conductive composite material. The heat probe protrudes from the docking station and is received within the opening in the heat sink when the portable is coupled to the docking station. The cooling end of the heat probe located within the docking station is further cooled by a large fan sink included within the docking station.

Figure 1:
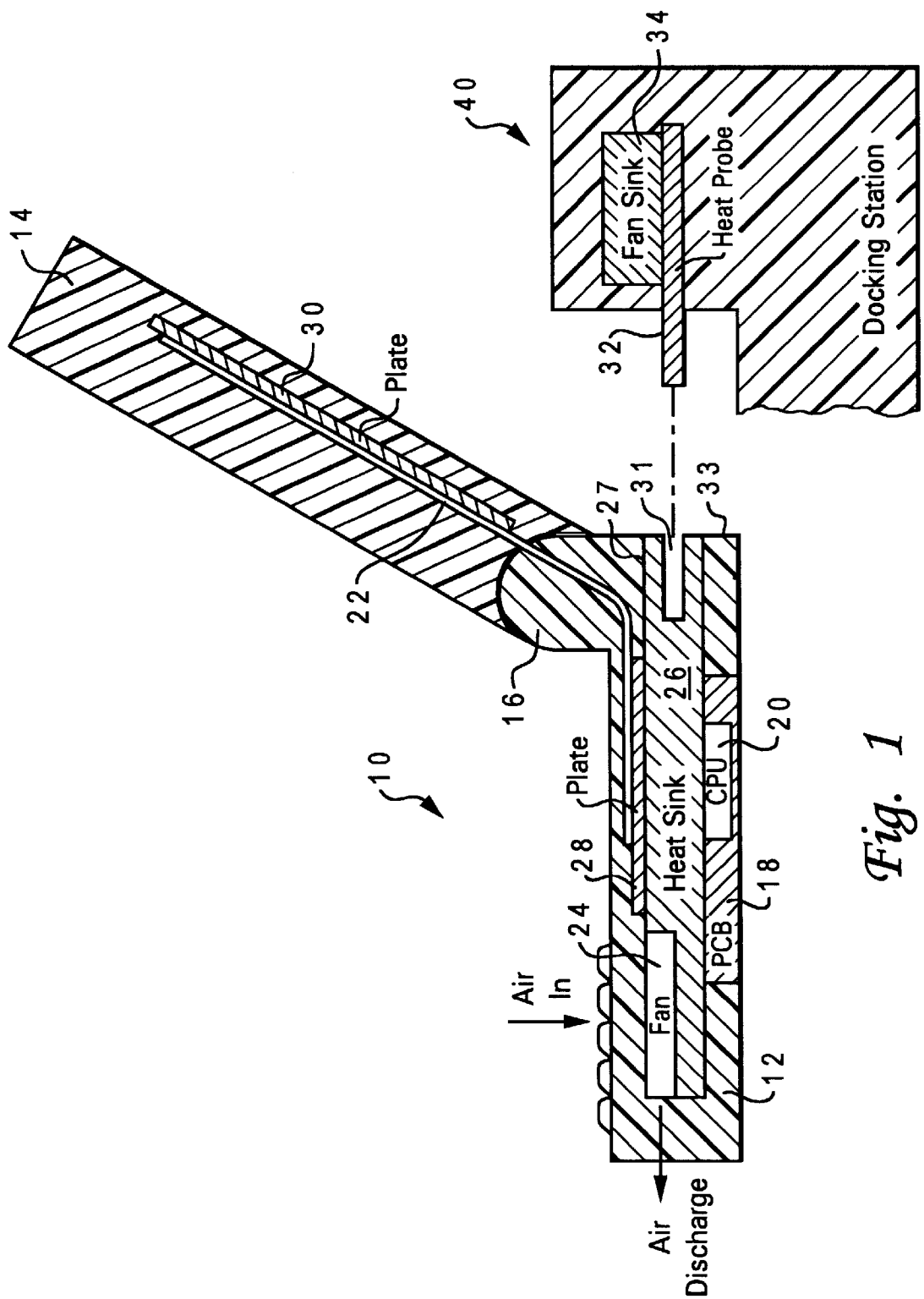
FIG. 1 illustrates a side cross-sectional view of a portable computer system and docking station, both having an improved cooling apparatus in accordance with the method and system of the present invention.
Figure 2B:
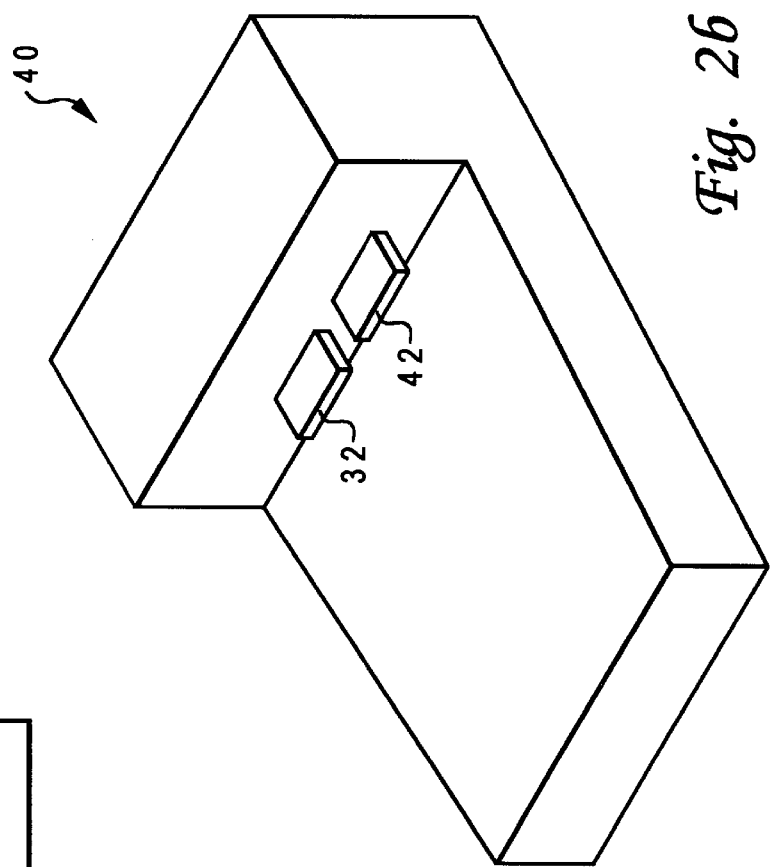
FIG. 2*b* illustrates a perspective view of a docking station in accordance with the method and system of the present invention.
Figure 2A:
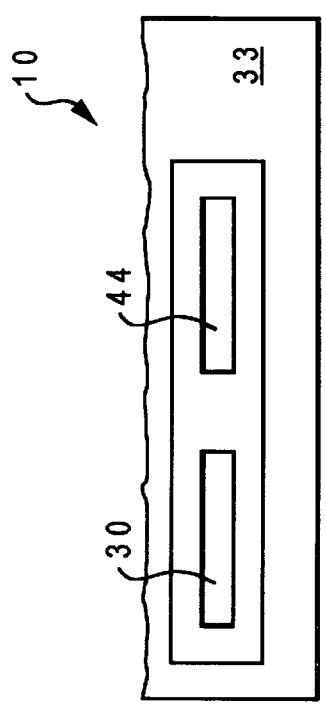
FIG. 2*a* depicts a back view of a portable computer system in accordance with the method and system of the present invention.

FIG. 1 depicts a side cross-sectional view of a portable computer system and docking station, both having an improved cooling apparatus in accordance with the method and system of the present invention. Portable computer system 10 includes a base housing 12 coupled to a display housing 14. Base housing 12 and display housing 14 are coupled together as is known in the art, preferably utilizing a hinge means 16. Included within base housing 12 is a printed circuit board 18 including a CPU 20. CPU 20 is a heat generating component. Other heat generating components, not shown, are also typically included within base housing 12. Therefore, base housing 12 generates considerably more heat during operation than does display housing 14.

The present invention transfers heat generated by base housing 12 to display housing 14 utilizing a round heat pipe 22. Base housing 12 includes a heat sink 26. Heat sink 26 is located on top of a CPU 20 for removing heat generated by CPU 20. A top 27 of heat sink 26 is smooth and flat so as to better receive a heat spreader plate 28. Heat sink 26 includes a fan 24 in one end and an opening 31 at a second, opposing end. Heat spreader plate 28 is coupled to said heat sink 26 to dissipate heat from heat sink 26. Heat pipe 22 is received by spreader plate 28 to remove heat from spreader plate 28 to display housing 14.

Within display housing 14, a dissipater plate 30 is included which is capable of receiving heat pipe 22 for dissipating the heat received from base housing 12.

Heat sink 26 is formed from a highly conductive composite material. The composite material is a treated carbon fiber mesh in a carbon matrix. The loading of the fiber along with the curing process determines the thermal conductivity of the resulting composite. The percentage loading of the carbon fibers by weight can vary between 20% to 50% depending on the thermal conductivity required with the higher loading enabling better conductivity values. The values of the thermal conductivity that can be obtained range from 200 W/m-K to 1500 W/m-k depending on the loading and the heat treatment process. In addition, the carbon fiber composite material may be easily molded in the required flat, smooth shape. One supplier of such a material is Allied Signal, Inc, 3201 W. Lomita Boulevard, Torrance, Calif.

Heat sink 26 formed from carbon composite material is capable of cooling CPU 20 up to 8 watts when computer system 10 is in a stand-alone mode, not coupled to a docking station 40. Fan 24 included within heat sink 26 blows air over heat sink 26 to remove the heat.

Cooling is further enhanced by heat pipe 22 coupled to dissipater plate 30. Dissipater plate 30 and spreader plate 28 are both also formed from the carbon fiber composite material. The addition of dissipater plate 30 further cools CPU 20 an additional 8 to 14 watts when portable computer 10 is functioning in a stand-alone configuration.

Heat sink 26 includes a rectangular opening 31 for receiving a heat probe 32 included within docking station 40. opening 31 is accessible through an opening in back 33 of portable computer 10. When portable computer system 10 is coupled to docking station 40 by coupling docking connector 42 with portable computer receptacle 44, the flat, rectangular heat probe 32 is received within opening 30. In this manner, additional heat is dissipated from CPU 20 by passing additional heat from heat sink 26 through heat probe 32. A fan sink 34 is included within docking station 40 to discharge the heat from heat probe 32. Heat probe 32 is a flat plate preferably formed from the carbon fiber composite material, although a flat heat pipe may be utilized. Heat probe 32 transfers heat from CPU 20 in portable computer 10 to fan sink 34 in docking station 40. Fan sink 34 is attached to the cooling end of heat probe 32. A fan blows air over heat probe 32 to remove the heat.

When portable computer 10 is coupled to docking station 40, a total of 20 watts may be dissipated from CPU 20. The total heat dissipated by docking station 40 will vary according to the size of fan sink 34.

While a preferred embodiment has been particularly shown and described, it will be understood by those skilled in the art that various changes in form and detail may be made therein without departing from the spirit and scope of the present invention.

What is claimed is:

1. A portable data processing system for improving cooling of a microprocessor included within said system, said portable data processing system including a base housing for housing a CPU and a display housing coupled to said base housing utilizing a hinge means, comprising:
   a heat sink formed from a highly conductive composite material within said base housing;
   a fan associated with said heat sink for dissipating heat therefrom;
   a heat dissipater formed from a highly conductive composite material within said display housing;
   said heat sink coupled to said heat dissipater utilizing a heat pipe, wherein heat is transferred from said heat sink to said heat dissipater utilizing said heat pipe;
   a spreader plate coupled to said heat sink for dissipating heat from said heat sink, said heat pipe being coupled to spreader plate for removing heat from said spreader plate to said dissipater plate in said display housing;
   a docking station for receiving said portable data processing system, said docking station including a heat probe protruding from said docking station, said heat probe being formed from a highly conductive composite material; and
   said heat sink included within said portable data processing system for receiving said heat probe when said portable data processing system is coupled to said docking station.

2. The apparatus according to claim 1, further comprising said heat sink including an opening for receiving said heat probe when said portable data processing system is coupled to said docking station.

3. The apparatus according to claim 2, further comprising said heat sink including said opening in a first end of said heat sink and said fan included in a second, opposing end of said heat sink.

4. The apparatus according to claim 3, further comprising said docking station including a fan sink coupled to a cooling end of said heat probe for dissipating heat from said heat probe.

5. The apparatus according to claim 4, further comprising said heat sink, said heat dissipator plate, and said heat probe being formed from a carbon fiber composite material.

6. The apparatus according to claim 5, further comprising said heat probe being a flat, rectangular heat probe.

7. A method for efficiently cooling a microprocessor included within a portable computer system, said portable data processing system including a base housing for housing a CPU and a display housing coupled to said base housing utilizing a hinge means, said method comprising the steps of:

establishing a fan in association with said heat sink for dissipating heat therefrom:

establishing a heat sink formed from a highly conductive composite material within said base housing;

establishing a heat dissipater formed from a highly conductive composite material within said display housing;

coupling said heat sink to said heat dissipater utilizing a heat pipe, wherein heat is transferred from said heat sink to said heat dissipater utilizing said heat pipe;

establishing a spreader plate coupled to said heat sink for dissipating heat from said heat sink, said heat pipe being coupled to spreader plate for removing heat from said spreader plate to said dissipater plate in said display housing;

establishing a docking station for receiving said portable data processing system, said docking station including a heat probe protruding from said docking station, said heat probe being formed from a highly conductive composite material; and said heat sink included within said portable data processing system receiving said heat probe when said portable data processing system is coupled to said docking station.

8. The method according to claim 7, further comprising establishing an opening in said heat sink for receiving said heat probe when said portable data processing system is coupled to said docking station.

9. The method according to claim 8, further comprising forming said opening in a first end of said heat sink and forming said fan included in a second, opposing end of said heat sink.

10. The method according to claim 9, further comprising establishing a fan sink coupled to a cooling end of said heat probe in said docking station for dissipating heat from said heat probe.

11. The method according to claim 10, further comprising forming said heat sink, said heat dissipator plate, and said heat probe from a carbon fiber composite material.

12. The method according to claim 11, further comprising forming a flat, rectangular heat probe.

13. A portable data processing system for improving cooling of a microprocessor included within said system, said portable data processing system including a base housing for housing a CPU and a display housing coupled to said base housing utilizing a hinge means, comprising:

a heat sink formed from a highly conductive composite material within said base housing;

a heat dissipater formed from a highly conductive composite material within said display housing;

said heat sink coupled to said heat dissipater utilizing a heat pipe, wherein heat is transferred from said heat sink to said heat dissipater utilizing said heat pipe;

a docking station for receiving said portable data processing system, said docking station including a heat probe protruding from said docking station, said heat probe being formed from a highly conductive composite material;

said heat sink included within said portable data processing system for receiving said heat probe when said portable data processing system is coupled to said docking station; and a spreader plate coupled to said heat sink for dissipating heat from said heat sink, said heat pipe being coupled to spreader plate for removing heat from said spreader plate to said dissipater plate in said display housing.

14. The apparatus according to claim 13, further comprising said heat sink including a fan for dissipating heat from said heat sink.

15. The apparatus according to claim 14, further comprising said heat sink including an opening for receiving said heat probe when said portable data processing system is coupled to said docking station.

16. The apparatus according to claim 15, further comprising said heat sink including said opening in a first end of said heat sink and said fan included in a second, opposing end of said heat sink.

17. The apparatus according to claim 16, further comprising said docking station including a fan sink coupled to a cooling end of said heat probe for dissipating heat from said heat probe.

18. The apparatus according to claim 17, further comprising said heat sink, said heat dissipater plate, and said heat probe being formed from a carbon fiber composite material.

19. The apparatus according to claim 18, further comprising said heat probe being a flat, rectangular heat probe.

20. A method for efficiently cooling a microprocessor included within a portable computer system, said portable data processing system including a base housing for housing a CPU and a display housing coupled to said base housing utilizing a hinge means, said method comprising the steps of:

establishing a heat sink formed from a highly conductive composite material within said base housing;

establishing a heat dissipater formed from a highly conductive composite material within said display housing;

coupling said heat sink to said heat dissipater utilizing a heat pipe, wherein heat is transferred from said heat sink to said heat dissipater utilizing said heat pipe;

establishing a docking station for receiving said portable data processing system, said docking station including a heat probe protruding from said docking station, said heat probe being formed from a highly conductive composite material;

said heat sink included within said portable data processing system receiving said heat probe when said portable data processing system is coupled to said docking station; and establishing a spreader plate coupled to said heat sink for dissipating heat from said heat sink, said heat pipe being coupled to spreader plate for removing heat from said spreader plate to said dissipater plate in said display housing.

21. The method according to claim 20, further comprising establishing a fan in said heat sink for dissipating heat from said heat sink.

22. The method according to claim 21, further comprising establishing an opening in said heat sink for receiving said heat probe when said portable data processing system is coupled to said docking station.

23. The method according to claim 22, further comprising forming said opening in a first end of said heat sink and forming said fan included in a second, opposing end of said heat sink.

24. The method according to claim 23, further comprising establishing a fan sink coupled to a cooling end of said heat probe in said docking station for dissipating heat from said heat probe.

25. The method according to claim 24, further comprising forming said heat sink, said heat dissipater plate, and said heat probe from a carbon fiber composite material.

26. The method according to claim 25, further comprising forming a flat, rectangular heat probe.

* * * * *